Dec. 15, 1931.  E. R. KNAPP  1,836,758
APPARATUS FOR REMOVING DUST FROM GASES
Filed Dec. 22, 1928
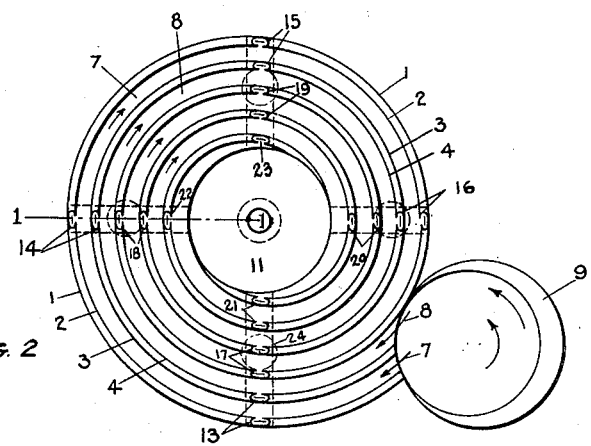
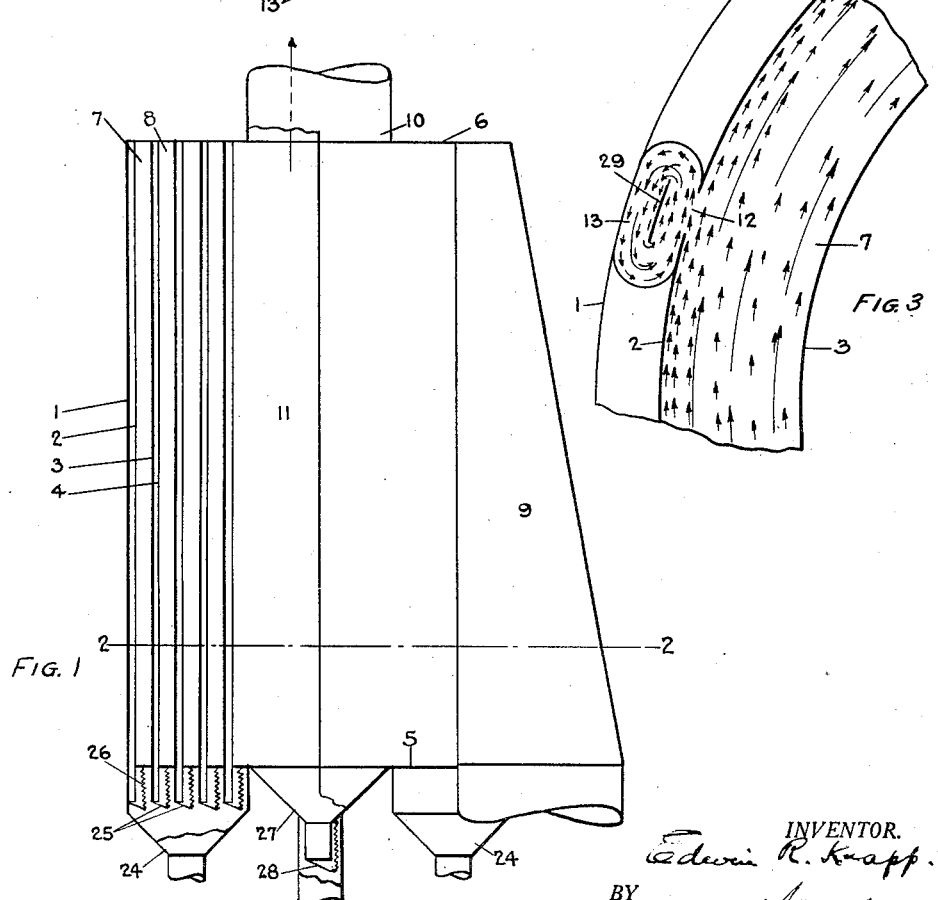
INVENTOR.
Edwin R. Knapp.
BY Meyers & Jones.
His ATTORNEYS.

Patented Dec. 15, 1931

1,836,758

UNITED STATES PATENT OFFICE

EDWIN R. KNAPP, OF SUMMIT, NEW JERSEY, ASSIGNOR TO PEABODY ENGINEERING CORPORATION, OF NEW YORK, N. Y., A CORPORATION OF NEW YORK

APPARATUS FOR REMOVING DUST FROM GASES

Application filed December 22, 1928. Serial No. 327,870.

My invention relates to apparatus for removing dust particles from gases. It is particularly applicable for removing ash or unburned carbon from combustion gases from industrial furnaces, also for removing powdered lime carried over from the kiln, and other products obtained by processes delivering them in the form of dust carried in streams of air or other gas and, in general, in processes where dust carried into the atmosphere is detrimental or where its recovery would be a possible by-product in the process.

The invention will be understood by reference to the accompanying drawings in which Fig. 1 is an elevation showing an outside view at the right, and a sectional view at the left along the plane of the line 1—1 of Fig. 2; Fig. 2 is a sectional plan view on the plane of the line 2—2 of Fig. 1; and Fig. 3 is an enlarged detailed horizontal section of a portion of a spiral passage showing the manner of attaching the dust traps. Similar reference numerals indicate similar parts in the several views.

In order to simplify the description many of the structural details have been omitted as not essential to an understanding of the invention. As illustrated, the invention is designed to provide a plurality of gas passages between spirally arranged walls with provision at intervals along the passages to effect the removal of the particles from the gases by centrifugal force. In other words, the invention provides means by which dust laden gases are subjected to the action of centrifugal force and progressively and at intervals, during the travel of the gases, the resistance to the action of centrifugal force removed in such manner as to permit of the escape of the particles from the stream of gas without interruption of the flow of gas.

The particular apparatus may assume any convenient form. In that illustrated I provide a plurality of spirally arranged walls 1, 2, 3 and 4 respectively. These may be fabricated by bending to form suitable sections of sheet metal plate and joining them together by angles. The completed plates when assembled are secured to a base 5 and a cover 6 so as to provide two continuous spiral passages 7 and 8 for the gases in their travel from the flue connection 9 to the stack 10, or as is usually the case, to an exhaust fan not shown.

The outer ends of the wall, as shown in Fig. 1, are attached to the side of the flue connection 9 in such manner as to afford direct inlets from said connection to the passages 7 and 8. The inner ends of the four walls are so disposed as to form a cylindrical space 11 between the base 5 and cover 6, into which space the passages 7 and 8 discharge the clean gases and from which the latter escape through the stack 10.

At suitable intervals along the passages 7 and 8 the walls 2 and 4 are cut away to provide openings 12 leading to dust traps. These are arranged in pairs, though this is not necessary, numbered from 13 to 21, and two individual traps 22 and 23. The traps are preferably made of sheet metal and are oval in transverse section, as shown in Fig. 3, and with or without the center longitudinal guide plate 29 to direct the motion of captured dust particles in such manner as to prevent their return to the gas stream. The several pairs are arranged in four sets 90° apart, but the number and arrangement may be varied to suit particular conditions.

The lower ends of the traps extend into a hopper 24 as shown in Fig. 1 and are normally closed by hinged doors 25 held to their seats by springs 26.

A separator constructed as above described, when about fifty (50') feet in height and thirty-five (35') feet to forty (40') feet in diameter, will treat approximately 250,000 cubic feet of dust laden gases per minute. In practice, the gas passages 7 and 8 may be 6" to 8" in width and 5 or 4 in number for volume of gas mentioned, and the dead space between plates 1 and 2, and 3 and 4, about 4" in width. The dust traps may be approximately 12" long in horizontal section, and 4" deep. The openings 12 into the traps are approximately 6" in width, and the guide plate 29 approximately 6" long. These dimensions are given merely as an example and are not to be taken as limiting the invention in any way.

In operation, the dust laden gases, from whatever source, enter the passages 7 and 8 from the flue connection 9 and flow through said passages in a continuous and uninterrupted stream to the outlet 10. During the travel of gases through the narrow vertical passages 7 and 8 in decreasing radii toward the central chamber 11, the dust particles carried in suspension will be thrown outward with increasing force toward the outer walls of the passages so that as they flow past the trap inlets 12 they will be thrown from the gases by the action of centrifugal force and will enter the traps somewhat in the manner indicated by the arrows in Fig. 3.

The advantage of inflow as compared with outflow is that centrifugal force increases with decrease in radius of travel and therefore the dust particles will be thrown off from the gases in the order of their densities as the gases travel toward the central chamber 11. The denser particles being thrown out first, reduces the friction against and constant wear on the outer walls, while the less dense particles, moving continuously outward are thrown out more rapidly and are ultimately removed farther on by the increasing centrifugal force. The number and frequency of traps is determined by the quantity and nature of the dust particles to be removed. The particles in the trap, free from translation, will settle to the bottoms of the traps as they revolve and will be discharged when their weight is sufficient to open the flap doors 25. The accumulated mass may be removed from the hopper 24 by any suitable means. While the dust particles are being thrown outward by centrifugal force, they are also falling under the action of gravity so that upon entering the central chamber 11, any particles still remaining will be thrown outward and downward into hopper 27 from which they will be discharged upon the opening of the flap door 28 while the dust freed gases rise at the center with increasing velocity and volume and finally escape through the outlet 10.

The number of gas passages and traps may be varied according to conditions met with in any particular installation but in all cases the essentials should be maintained of giving to the gases a rapid spiral movement of translation from the inlet to the outlet, and at intervals permitting the dust particles to escape through openings in the walls without diverting abruptly the direction of flow of the gases.

The advantage in dividing the stream of gas into a plurality of narrow passages is the reduction in distance the dust particles must travel and consequent reduction in time to reach a place of escape from the stream of gas. Also this arrangement provides for the removal of dust particles entirely from the stream of gas in each succeeding revolution rather than from an inner preceding part of the stream to a following outer part of the stream of gas.

For the purpose of the present case, the outer wall may be regarded as the casing of the separator, the interior of which is divided by one or more walls to provide one or more spiral passages to provide paths of travel for the gases of decreasing radii from the inlet to the outlet.

What I claim is:

1. An apparatus for separating dust particles from gases comprising a casing, spirally arranged walls supported within the casing to provide a plurality of continuous passages of decreasing radii for the gases, traps secured to said walls and having openings leading from said passages to permit the escape of the particles under the action of centrifugal force as the gases flow past said openings, said traps being provided with guide plates to prevent the dust particles returning to the stream of gas.

2. A dust separator comprising a casing having top and bottom walls, spirally arranged walls within the casing to provide a continuous spiral passage of decreasing radius and of substantially uniform cross-sectional area, the outer wall of said passage having unobstructed openings at intervals therein, members fitted to said openings and constituting traps extending from the bottom to the top wall of the casing and arranged in such relation so said openings as to permit the escape of particles thereinto under the action of centrifugal force without interrupting the direction of the flow of the gas, and a guide-plate in each of said traps around which the escaped particles are caused to travel while settling by gravity.

3. A dust separator comprising a casing having top and bottom walls, spirally arranged walls within the casing to provide a continuous spiral passage of decreasing radius and of substantially uniform cross-sectional area, the outer wall of said passage having unobstructed openings at intervals therein, members fitted to said openings and constituting traps extending from the bottom to the top wall of the casing and arranged in such relation to said openings as to permit the escape of particles thereinto under the action of centrifugal force without interrupting the direction of flow of the gas, and a guide plate supported in each of said traps substantially parallel with the walls of the gas passage to prevent dust particles returning from the traps to said passage.

4. A dust separator comprising a casing having top and bottom walls, spirally arranged walls within the casing to provide a continuous spiral passage of decreasing radius and of substantially uniform cross-sectional area, the outer wall of said passage having unobstructed openings at intervals therein, members fitted to said openings and constituting traps extending from the bottom to the top wall of the casing, a guide-plate in each of said traps arranged substantially parallel with the walls of the gas passage to prevent dust particles returning from the traps to said passage, said traps being arranged in groups radially of the casing, and a hopper for each group of traps.

Signed at New York, in the county of New York and State of New York this 18th day of December, A. D. 1928.

EDWIN R. KNAPP.